(12) United States Patent
Buburuzan

(10) Patent No.: US 10,616,790 B2
(45) Date of Patent: Apr. 7, 2020

(54) METHOD AND APPARATUS FOR CONFIGURING A DATA TRANSMISSION VIA A TRANSMISSION CHANNEL OF A WIRELESS COMMUNICATION SYSTEM WITH LOCAL OVERLOAD CONTROL

(71) Applicant: VOLKSWAGEN AKTIENGESELLSCHAFT, Wolfsburg (DE)

(72) Inventor: Teodor Buburuzan, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 70 days.

(21) Appl. No.: 15/767,658

(22) PCT Filed: Sep. 12, 2016

(86) PCT No.: PCT/EP2016/071393
§ 371 (c)(1),
(2) Date: Apr. 12, 2018

(87) PCT Pub. No.: WO2017/063801
PCT Pub. Date: Apr. 20, 2017

(65) Prior Publication Data
US 2018/0310200 A1 Oct. 25, 2018

(30) Foreign Application Priority Data
Oct. 13, 2015 (DE) .................. 10 2015 219 785

(51) Int. Cl.
*H04W 28/02* (2009.01)
*H04W 72/04* (2009.01)
(Continued)

(52) U.S. Cl.
CPC ......... *H04W 28/0252* (2013.01); *H04L 47/12* (2013.01); *H04L 47/28* (2013.01);
(Continued)

(58) Field of Classification Search
CPC ......... H04W 28/0252; H04W 72/0493; H04W 74/0875; H04W 74/0891; H04W 84/005;
(Continued)

(56) References Cited

U.S. PATENT DOCUMENTS

| 2014/0126557 A1* | 5/2014 | Kasslatter | H04L 5/0091 370/336 |
| 2016/0055745 A1* | 2/2016 | Karacan | H04W 4/046 701/117 |

(Continued)

FOREIGN PATENT DOCUMENTS

| DE | 102012208645 A1 | 11/2013 |
| DE | 102013205058 A1 | 9/2014 |

(Continued)

OTHER PUBLICATIONS

Bansal et al.; Comparing LIMERIC and DCC Approaches for VANET Channel Congestion Control; IEEE Wireless Vehicular Communications (WiVeC) 2014; Sep. 2014; pp. 1-7.

(Continued)

*Primary Examiner* — Afsar M Qureshi
(74) *Attorney, Agent, or Firm* — Barnes & Thornburg LLP

(57) ABSTRACT

A method for configuring a data transmission via a transmission channel of a wireless communication system with local overload control, wherein the local overload control has a relaxed state, an activated state, and a restricted state. There are five activated states are provided, each of which are based on a channel load in the transmission channel.

15 Claims, 3 Drawing Sheets

(51) Int. Cl.
*H04W 74/08* (2009.01)
*H04L 12/801* (2013.01)
*H04L 12/841* (2013.01)
*H04W 84/00* (2009.01)
*H04L 12/815* (2013.01)
*H04L 12/851* (2013.01)
*H04W 84/18* (2009.01)

(52) U.S. Cl.
CPC ... *H04W 28/0205* (2013.01); *H04W 72/0493* (2013.01); *H04W 74/0875* (2013.01); *H04W 74/0891* (2013.01); *H04L 47/22* (2013.01); *H04L 47/24* (2013.01); *H04W 84/005* (2013.01); *H04W 84/18* (2013.01)

(58) Field of Classification Search
CPC ...... H04W 84/18; H04L 47/12; H04L 47/128; H04L 47/22; H04L 47/24
See application file for complete search history.

(56) References Cited

U.S. PATENT DOCUMENTS

2016/0174122 A1* 6/2016 Sorrentino ........... H04B 1/3822 370/331
2017/0272971 A1* 9/2017 Boban .................. H04W 28/08
2017/0367005 A1* 12/2017 Shi ........................ H04W 4/70

FOREIGN PATENT DOCUMENTS

DE 102013013621 A1 2/2015
DE 102014201648 A1 7/2015
JP 20170272971 * 10/2014

OTHER PUBLICATIONS

DCC Workshop; CAR 2 CAR Communication Consortium; ETSI DCC Standardization Activities Report of the ETSI STF 420/447 Activities; Jul. 11, 2012.
ETSI TR 101 612; Intelligent Transport Systems (ITS); Cross Layer DCC Management Entity for operation in the ITS G5A and ITS G5B medium; Report on Cross layer DCC algorithms and performance evaluation; Sep. 2014.
ETSI TR 101 613; Intelligent Transport Systems (ITS); Cross Layer DCC Management Entity for operation in the ITS G5A and ITS G5B medium; Validation set-up and results; Sep. 2015.
ETSI TS 102 687; Intelligent Transport Systems (ITS); Decentralized congestion Control Mechanisms for Intelligent Transport Systems operating in the 5 GHz range; Access layer part; Jul. 2011.
ETSI TS 102 724; Intelligent Transport Systems (ITS); Harmonized Channel Specifications for Intelligent Transport Systems operating in the 5 GHz frequency band; Oct. 2012.
Liu; Evaluation of platoon Application Enabled by Contemporary ETSI ITS-G5 Standards; Jun. 25, 2015.
Search Report for German Patent Application No. 10 2015 219 785.9; dated Apr. 6, 2016.
Search Report for International Patent Application No. PCT/EP2016/071393; dated Dec. 19, 2016.

* cited by examiner

| DCC | CL | $T_{OFF}$ |
|---|---|---|
| Rel (0) | 0% ≤ CL < 19% | 60ms |
| A1 (1) | 19% ≤ CL < 27% | 100ms |
| A2 (2) | 27% ≤ CL < 35% | 180ms |
| A3 (3) | 35% ≤ CL < 43% | 260ms |
| A4 (4) | 43% ≤ CL < 51% | 340ms |
| A5 (5) | 51% ≤ CL < 59% | 420ms |
| Res (6) | 59% ≤ CL | 460ms |

FIG. 2

|     | Rel     | A1       | A2       | A3       | A4       | A5       | Res    |
|-----|---------|----------|----------|----------|----------|----------|--------|
| CL  | 0%; 19% | 19%; 27% | 27%; 35% | 35%; 43% | 43%; 51% | 51%; 59% | ≥59%   |
| DP0 | 100ms   | 100ms    | 100ms    | 100ms    | 100ms    | 100ms    | 100ms  |
| DP1 | 100ms   | 140ms    | 180ms    | 220ms    | 260ms    | 300ms    | 340ms  |
| DP2 | 100ms   | 140ms    | 180ms    | 220ms    | 260ms    | 300ms    | 340ms  |
| DP3 | 100ms   | 350ms    | 600ms    | 850ms    | 1100ms   | 1350ms   | 1600ms |

FIG. 3

METHOD AND APPARATUS FOR CONFIGURING A DATA TRANSMISSION VIA A TRANSMISSION CHANNEL OF A WIRELESS COMMUNICATION SYSTEM WITH LOCAL OVERLOAD CONTROL

PRIORITY CLAIM

This patent application is a U.S. National Phase of International Patent Application No. PCT/EP2016/071393, filed 12 Sep. 2016, which claims priority to German Patent Application No. 10 2015 219 785.9, filed 13 Oct. 2015, the disclosures of which are incorporated herein by reference in their entireties.

SUMMARY

Illustrative embodiments relate to a method and an apparatus for configuring a data transmission via a transmission channel of a wireless communication system with decentralized congestion control, and to a transportation vehicle and a computer program product.

BRIEF DESCRIPTION OF THE DRAWINGS

The disclosed embodiments are explained below based on the associated drawings, in which:

FIG. 2 shows a configuration table of decentralized congestion control; and

FIG. 3 shows a further configuration table of decentralized congestion control.

DETAILED DESCRIPTION

Figure 1:
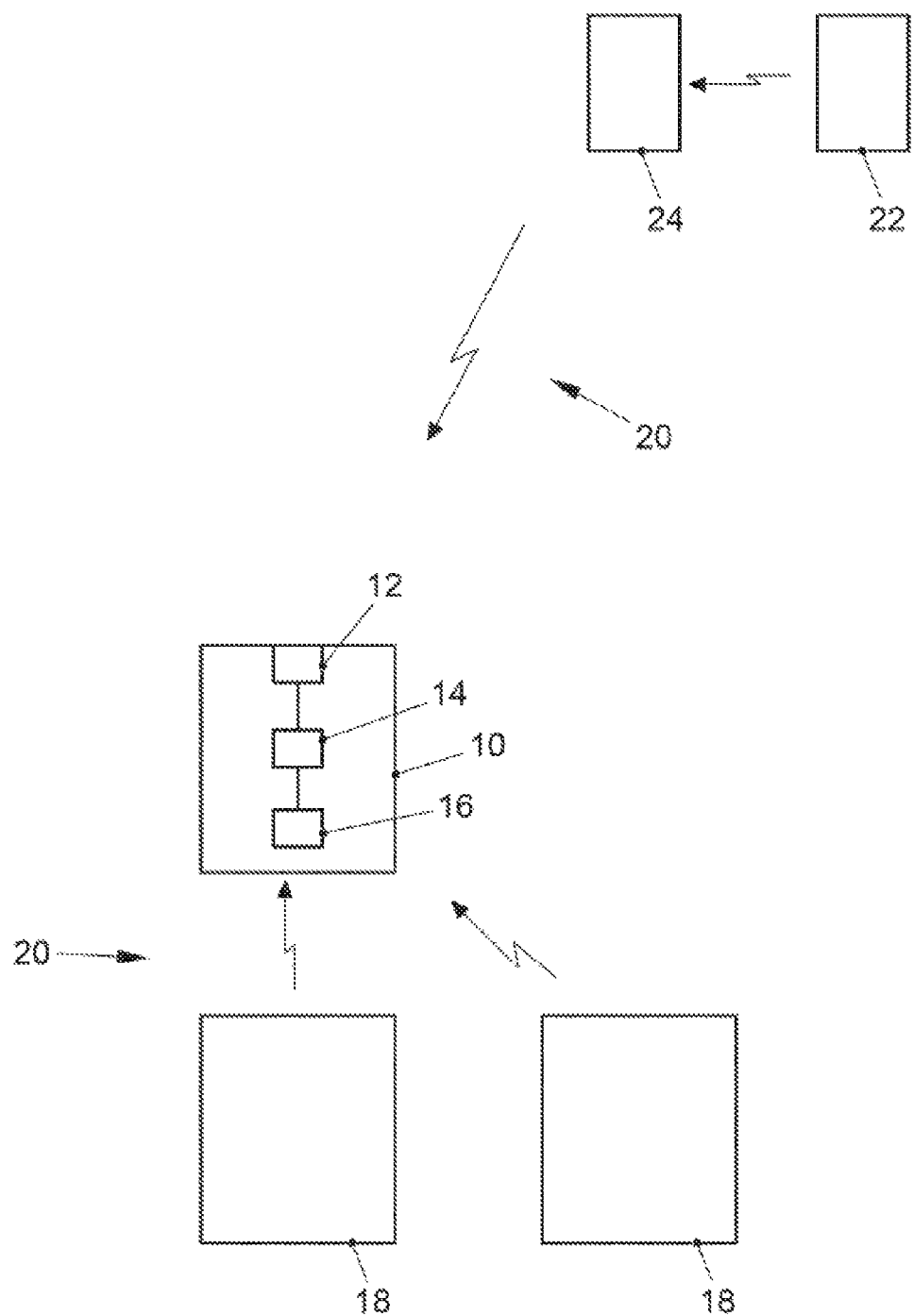
FIG. 1 shows a schematic illustration of a wireless communication system with decentralized congestion control.

The control of data traffic or messages is an important point in communication networks for increasing or ensuring reliability and efficiency. This is also an important point in C2C (car-to-car) networks since safety-relevant information must be transmitted with low latency and high reliability even in situations with a high transportation vehicle density and/or speed.

Current approaches of such communication or cooperation networks use a shared transmission medium, that is to say all users or transportation vehicles use the same transmission channel, in an ad-hoc network without central control. Therefore, decentralized congestion control DCC is often proposed. On account of the high mobility of the users, the decentralized congestion control must be able to process situations with rapidly changing channel loads.

ETSI TS 102 687 describes principles of decentralized congestion control DCC with four mechanisms: power control, transmit rate control, sensitivity control and data rate control. The subdivision into relaxed, activated and restricted states is described.

ETSI TS 102 724 describes congestion control profiles DP (DCC profiles).

DE 10 2012 208 645 A1 and DE 10 2013 205 058 A1 disclose a method for operating a stationary device in which addresses are assigned according to the determined geographical position.

DE 10 2013 013 621 A1 discloses a safety-compliant channel change in intelligent transport systems, the channel being changed on the basis of a risk of conflict with other road users.

DE 10 2014 201 648 A1 discloses a method for communicating within a motorized transportation vehicle communication system, in particular, a wireless motorized transportation vehicle communication system, interacting in the manner of the ad-hoc network, in which the transportation vehicle's own position in the current lane is determined.

ETSI TR 101 612 V1.1.1 (2014-09) discloses a performance test of reactive and linear adaptive DCC mechanisms. The reactive approach is based, for example, on one relaxed state, five active states and one restricted DCC state, wherein each active state is assigned to a restriction of the usable Rtx in the channel, and the linear adaptive approach sets a target CL and then positively or negatively adapts the Rtx to reach the target CL.

ETSI TR 101 613 V1.1.1 (2015-09) describes a validation set-up and results for a cross-layer DCC management entity for operation in an ITS GSA and ITS G5B medium using one relaxed state, five active states and one restricted DCC state.

Bansal, G. et al.; "Comparing LIMERIC and DCC Approaches for VANET Channel Congestion Control", in: IEEE Wireless Vehicular Communications (WiVeC) 2014, pages 1-7, September 2014, compares LIMERIC and DCC approaches for channel congestion control in IEEE 802.11p-based transportation vehicles and ad-hoc networks.

The disclosed embodiments improve the data traffic in a wireless communication system with decentralized congestion control.

This is achieved by a method, an apparatus, a transportation vehicle and a computer program product.

The disclosed method for configuring a data transmission via a transmission channel of a wireless communication system with decentralized congestion control, wherein the decentralized congestion control comprises a relaxed state, an activated state and a restricted state, provides for five activated states to be provided, the classification of which is based on a channel load in the transmission channel.

The transmission channel may comprise one or more physical channels and/or logical channels such as control or service channels. The channel load indicates the load or loading on the transmission channel caused by data or messages and is indicated in percent. The percentage value of the channel load is then the used portion of the total bandwidth, which corresponds to 100%, of the channel.

In the disclosed method, the performance is improved, in particular, under difficult conditions, with regard to the packet error rate, packet collisions and the packet transmission delay or latency. It has been shown that the specification of five activated states results in the states being changed only relatively rarely even though the bandwidth of each of the five activated states is narrower than the only one activated state which is usually provided. As a result of the smaller number of changes and as a result of the fact that the decentralized congestion control remains in one of the active states more frequently, the data transmission efficiency can be increased.

Each of the five activated states can be defined for a channel load of 6% to 10%, optionally 8%. This bandwidth has been found to be beneficial during tests.

Provision may be made for the relaxed state (Rel) to be defined for a channel load of 0% to less than 17 to 21%, for a first activated state to be defined for a channel load of 17 to 21% to less than 25 to 29%, for a second activated state to be defined for a channel load of 25 to 29% to less than 33 to 37%, for a third activated state to be defined for a channel load of 33 to 37% to less than 41 to 45%, for a fourth activated state to be defined for a channel load of 41 to 45% to less than 49 to 53%, for a fifth activated state to be defined for a channel load of 49 to 53% to less than 57 to 61%, and for the restricted state to be defined for a channel load of greater than or equal to 57 to 61%. This further specification of all states allows very good congestion control.

Provision may also be made for the relaxed state (Rel) to be defined for a channel load of greater than or equal to 0% to less than 19%, for a first activated state to be defined for a channel load of greater than or equal to 19% to less than 27%, for a second activated state to be defined for a channel load of greater than or equal to 27% to less than 35%, for a third activated state to be defined for a channel load of greater than or equal to 35% to less than 43%, for a fourth activated state to be defined for a channel load of greater than or equal to 43% to less than 51%, for a fifth activated state to be defined for a channel load of greater than or equal to 51% to less than 59%, and for the restricted state to be defined for a channel load of greater than or equal to 59%. This further specification of all states also allows very good congestion control.

A specific data transmission interval can be assigned to each of the states. The data transmission interval is usually measured in milliseconds (ms) and indicates the period after which the next message or the next data can be sent via the transmission channel. In other words, the data transmission interval can indicate the break between two transmission operations or two access operations to the transmission channel, in which the user cannot access the transmission channel.

Provision may be made for the data transmission interval to be 40 to 80 ms, optionally 60 ms, for the relaxed state, to be 80 to 120 ms, optionally 100 ms, for a first activated state, to be 160 to 200 ms, optionally 180 ms, for a second activated state, to be 240 to 280 ms, optionally 260 ms, for a third activated state, to be 320 to 360 ms, optionally 340 ms, for a fourth activated state, to be 400 to 440 ms, optionally 420 ms, for a fifth activated state, and to be 440 to 480 ms, optionally 460 ms, for the restricted state. It has been found that these increasing data transmission intervals provide very good results.

Four congestion control profiles may be provided, wherein a specific data transmission interval is assigned to each congestion control profile for each state. The congestion control profiles introduce, as it were, a second dimension for the decentralized congestion control, which increases the efficiency and flexibility. In addition to the four congestion control profiles, it is possible to define a fifth congestion control profile for conducting other services, for example, from a smartphone. The congestion control profiles make it possible to prioritize particular users and/or services or types of data or messages or to handle them with a lower priority.

A minimum data transmission interval can be assigned to a first congestion control profile for each state. The minimum data transmission interval may correspond in this case to the minimum possible latency of the communication system, that is to say transmitter, transmission path and/or receiver. A congestion control profile which allows especially prioritized transmission, for example, for very relevant information such as in the event of an accident, is therefore available.

Provision may be made for a data transmission interval of 100 ms to be assigned to a first congestion control profile for each state, for a data transmission interval of 100 ms to be assigned to a second and a third congestion control profile for the relaxed state, a data transmission interval of 140 ms to be assigned for a first activated state, a data transmission interval of 180 ms to be assigned for a second activated state, a data transmission interval of 220 ms to be assigned for a third activated state, a data transmission interval of 260 ms to be assigned for a fourth activated state, a data transmission interval of 300 ms to be assigned for a fifth activated state and a data transmission interval of 340 ms to be assigned for the restricted state, and for a data transmission interval of 100 ms to be assigned to a fourth congestion control profile for the relaxed state, a data transmission interval of 350 ms to be assigned for a first activated state, a data transmission interval of 600 ms to be assigned for a second activated state, a data transmission interval of 850 ms to be assigned for a third activated state, a data transmission interval of 1100 ms to be assigned for a fourth activated state, a data transmission interval of 1350 ms to be assigned for a fifth activated state and a data transmission interval of 1600 ms to be assigned for the restricted state. This further specification of all congestion control profiles allows very good congestion control.

Decentralized environment notification messages (DENM) can be transmitted using a first and/or a second congestion control profile, and/or cooperative awareness messages (CAM) can transmitted using a third congestion control profile. According to the method, different message types of the vehicle-to-X network can be handled and transmitted differently depending on their importance and/or urgency. This allows the efficiency and safety to be increased.

The wireless communication system can be an ad-hoc network for the communication of mobile devices, in particular, a network according to a WLAN standard. The decentralized congestion control described is suitable for such networks.

The wireless communication system may be an ITS G5 network. The ITS (intelligent transportation system) G5 network is defined for these purposes and is suitable.

The disclosed apparatus for configuring a data transmission via a transmission channel of a wireless communication system with decentralized congestion control provides for the apparatus, in particular, a control device for a transportation vehicle or a mobile radio device, to be set up to carry out a method described above. In the case of transportation vehicles and mobile radio devices, in particular, the method promises reliable data transmission on account of the high mobility and/or speed of the users. The same benefits and modifications as those described above apply.

The disclosed transportation vehicle comprises an apparatus as described above. The same benefits and modifications as those described above apply.

The disclosed computer program product comprises program code for carrying out the method described above when the program product is executed on a computing unit or an apparatus described above. The same benefits and modifications as those described above apply.

Further configurations emerge from the other features mentioned in the dependent claims.

The various embodiments mentioned in this application can be combined with one another, unless stated otherwise in the individual case.

FIG. 1 shows a mobile device, here a transportation vehicle 10, in this example, for example, an automobile, a truck, a motorcycle, a bus or a train. All land transportation vehicles, aircraft and watercraft are considered here as a transportation vehicle. The mobile device may also be a mobile computer, for example, a tablet, or a mobile telephone, for example, a smartphone.

The transportation vehicle 10 contains a communication unit 12 which communicates with a control device 14 of the transportation vehicle in a wireless or wired manner. The communication unit 12 is, for example, a transmitting/receiving unit for a WLAN specified for V2X communication according to the IEEE 802.11p standard.

The control device 14 may be a dedicated control device, for example, for communication services, or a car-to-X system. The control device may also be a computing unit, for example, a microprocessor. The transportation vehicle 10 or the control device 14 also comprises decentralized congestion control 16 or a splitter of decentralized congestion control. The decentralized congestion control 16 is used to configure and control transmitting properties of the communication unit 12.

The communication unit 12 is used to set up a connection and/or the communication between the transportation vehicle 10 and further transportation vehicles 18, which are identical or similar to the transportation vehicle 10, to enable the participation in a communication service 20. The further transportation vehicles 18 contain one or more control devices and a communication unit. The communication service 20 is, for example, a V2X or vehicle-to-X service or a mobile radio service. Such services are referred to, for example, as car-to-car systems, car-to-infrastructure systems or car-to-X systems, in which case the X is a placeholder for any desired infrastructure devices, other transportation vehicles and other road users. Other conventional designations are car2C, car2X, C2C and C2X systems, vehicle-to-vehicle systems (V2V), vehicle-to-infrastructure systems (V2I) or vehicle-to-X systems (V2X).

The communication service 20 has at least one shared, that is to say by all users or transportation vehicles, or shareable transmission channel. The communication service 20 is an ad-hoc network, that is to say a network without central control, in which the users, such as the transportation vehicles 10 and 18, can log on and off in any desired manner. The communication service 20 is an ITS G5 network developed for car-to-X systems.

The transportation vehicles 18 communicate directly with the transportation vehicle 10. It is likewise possible for further transportation vehicles, for example, the transportation vehicle 22, to communicate indirectly via an installation 24, for example. The installation 24 may also be another stationary device, such as an infrastructure unit, for example, traffic lights or a transmission mast, or another transportation vehicle.

The method of operation of the decentralized congestion control 16, which is carried out in the control device 14 of the transportation vehicle 10, for example, is now described on the basis of FIGS. 2 and 3.

FIG. 2 illustrates a configuration table of decentralized congestion control 16. The decentralized congestion control 16 comprises a total of seven states: a relaxed state Rel, a first activated state A1, a second activated state A2, a third activated state A3, a fourth activated state A4, a fifth activated state A5 and a restricted state Res, the classifications of which are based on a channel load CL in the transmission channel. The decentralized congestion control 16 is not active in the relaxed state Rel and the channel load is very low there. The decentralized congestion control 16 is active in the activated states A1 to A5 since a sometimes considerable (here up to 59%) channel load CL is present. In the restricted state Res, the channel load CL is so high that normal operation can be maintained only with difficulty.

It has been found that a channel load or proportionate value of 8% of the bandwidth of the transmission channel or of the channel load is optimum for an activated state A1 to A5. The first activated state A1 begins with a channel load of 19%. The channel load of 0 to less than 19% selected here for the relaxed state Rel has proved to be well dimensioned for free operation and a soft transition between the relaxed state Rel and the activated states.

Provision is also made for the second activated state A2 to be defined for a channel load CL of greater than or equal to 27% to less than 35%, for the third activated state A3 to be defined for a channel load of greater than or equal to 35% to less than 43%, for the fourth activated state A4 to be defined for a channel load of greater than or equal to 43% to less than 51%, for the fifth activated state A5 to be defined for a channel load of greater than or equal to 51% to less than 59%, and for the restricted state Res to be defined for a channel load of greater than or equal to 59%.

On the basis of the channel load CL which is either measured by the user or is communicated to the latter, each user or the communication unit 12 of the user is set to a state of the decentralized congestion control 16.

With the assignment to one of the states of the decentralized congestion control 16, a specific data transmission interval TOFF is specified for the user, which data transmission interval defines the length of time for which the user cannot access the transmission channel.

In this case, the data transmission interval TOFF is 60 ms for the relaxed state Rel, 100 ms for the first activated state A1, 180 ms for the second activated state A2, 260 ms for the third activated state A3, 340 ms for the fourth activated state A4, 420 ms for the fifth activated state A5 and 460 ms for the restricted state Res. The graduated selection of the data transmission interval TOFF sets a prioritization which is used to control the repetition frequency of the access to the transmission channel by the user.

FIG. 3 illustrates a further table of decentralized congestion control 16. The tables from FIGS. 2 and 3 may be, for example, in a memory of the user, for example, in a control device 14 of the transportation vehicle 10 or a register of a microprocessor of a smartphone.

According to the table from FIG. 3, four congestion control profiles DP0, DP1, DP2, DP3 are also provided in addition to the states of the decentralized congestion control 16, in which case a specific data transmission interval is assigned to each congestion control profile DP0, DP1, DP2, DP3 for each state Rel, A1-A5 and Res.

A congestion control profile can be assigned to a user or to a data or message type; this can be carried out permanently or temporarily. The profile introduces a second dimension or a second facet for prioritization during transmission or during access to the transmission channel.

In this example, a minimum data transmission interval of 100 ms, for example, is assigned to the first congestion control profile DP0 for each state. Users or messages with this profile can therefore access the transmission channel at a maximum frequency irrespective of the channel load CL.

A data transmission interval of 100 ms is assigned to the second and third congestion control profiles DP1 and DP2 for the relaxed state Rel, a data transmission interval of 140 ms is assigned for the first activated state A1, a data transmission interval of 180 ms is assigned for the second activated state A2, a data transmission interval of 220 ms is assigned for the third activated state A3, a data transmission interval of 260 ms is assigned for the fourth activated state A4, a data transmission interval of 300 ms is assigned for the fifth activated state A5 and a data transmission interval of 340 ms is assigned for the restricted state Res.

A data transmission interval of 100 ms is assigned to the fourth congestion control profile DP3 for the relaxed state Rel, a data transmission interval of 350 ms is assigned for the first activated state A1, a data transmission interval of 600 ms is assigned for the second activated state A2, a data transmission interval of 850 ms is assigned for the third activated state A3, a data transmission interval of 1100 ms is assigned for the fourth activated state A4, a data transmission interval of 1350 ms is assigned for the fifth activated state A5 and a data transmission interval of 1600 ms is assigned for the restricted state Res.

This configuration ensures that only the most important messages or data are transmitted via the transmission channel in the case of an ever higher channel load. In the example of car-to-X communication, messages relating to a crash, for example, signals for parameterizing airbags or belt tensioners, are assigned to the congestion control profile DP0, for example.

In the event of heavy braking, that is to say in a situation in which only a few seconds of response time remain, signals, for example, for increasing the brake pressure, are assigned to the congestion control profile DP1, for example.

Such messages or signals can be regarded as decentralized environment notification messages (DENM).

Position notifications which contain information relating to the user, for example, speed, direction and the like, and are transmitted cyclically, for example, every 100 ms, can be assigned to the congestion control profile DP2. These messages can correspond to cooperative awareness messages (CAM).

Messages from convenience functions, for example, access to the Internet or a status report for traffic lights, are assigned to the fourth congestion control profile DP3, for example. If, for example, the report for traffic lights stating that the latter still have a red phase of a particular period, for example, seven seconds, is delayed by the decentralized congestion control 16 by 1 second, the receiver may be set up to calculate the difference between the stated period and the delay. In this example, the receiving user is informed that the red phase lasts for another six seconds.

One or more, optionally no more than two, further congestion control profiles may be provided to provide, for example, an open channel for further users, for example, a smartphone. In this manner, the communication system can also provide bandwidth for users outside the system if only little bandwidth is used by system data or system messages. The users outside the system can be incorporated by corresponding gateways or interfaces.

LIST OF REFERENCE SYMBOLS

10 Transportation vehicle
12 Communication unit
14 Control device
16 Decentralized congestion control
18 Transportation vehicle
20 Communication service
22 Transportation vehicle
24 Installation
Rel Relaxed state
A1 First activated state
A2 Second activated state
A3 Third activated state
A4 Fourth activated state
A5 Fifth activated state
Res Restricted state
CL Channel load
$T_{OFF}$ Data transmission interval
DP0 Congestion control profile
DP1 Congestion control profile
DP2 Congestion control profile
DP3 Congestion control profile

The invention claimed is:

1. A method for configuring a data transmission via a transmission channel of a wireless communication system with decentralized congestion control, wherein the decentralized congestion control comprises a relaxed state, an activated state and a restricted state, the method comprising:
classifying into one of five activated states based on a channel load in the transmission channel; and assigning a specific data transmission interval to each of four congestion control profiles for each activated state.

2. The method of claim 1, wherein each of the five activated states is defined for a channel load of 6% to 10%.

3. The method of claim 1, wherein the relaxed state is defined for a channel load of 0% to less than 17 to 21%, wherein a first activated state is defined for a channel load of 17 to 21% to less than 25 to 29%, wherein a second activated state is defined for a channel load of 25 to 29% to less than 33 to 37%, wherein a third activated state is defined for a channel load of 33 to 37% to less than 41 to 45%, wherein a fourth activated state is defined for a channel load of 41 to 45% to less than 49 to 53%, wherein a fifth activated state is defined for a channel load of 49 to 53% to less than 57 to 61%, and
wherein the restricted state is defined for a channel load of greater than or equal to 57 to 61%.

4. The method of claim 1, wherein the relaxed state is defined for a channel load of greater than or equal to 0% to less than 19%, wherein a first activated state is defined for a channel load of greater than or equal to 19% to less than 27%, wherein a second activated state is defined for a channel load of greater than or equal to 27% to less than 35%, wherein a third activated state is defined for a channel load of greater than or equal to 35% to less than 43%, wherein a fourth activated state is defined for a channel load of greater than or equal to 43% to less than 51%, wherein a fifth activated state is defined for a channel load of greater than or equal to 51% to less than 59%, and wherein the restricted state is defined for a channel load of greater than or equal to 59%.

5. The method of claim 1, wherein a specific data transmission interval is assigned to each of the states.

6. The method of claim 5, wherein the data transmission interval is 40 to 80 ms for the relaxed state, is 80 to 120 ms for a first activated state, is 160 to 200 ms for a second activated state, is 240 to 280 ms for a third activated state, is 320 to 360 ms for a fourth activated state, is 400 to 440 ms for a fifth activated state, and is 440 to 480 ms for the restricted state.

7. The method of claim 1, wherein a minimum data transmission interval is assigned to a first congestion control profile for each state.

8. The method of claim 1, wherein a data transmission interval of 100 ms is assigned to a first congestion control profile for each state, in that a data transmission interval of 100 ms is assigned to a second and a third congestion control profile for the relaxed state, a data transmission interval of 140 ms is assigned for a first activated state, a data transmission interval of 180 ms is assigned for a second activated state, a data transmission interval of 220 ms is assigned for a third activated state, a data transmission interval of 260 ms is assigned for a fourth activated state, a data transmission interval of 300 ms is assigned for a fifth activated state and a data transmission interval of 340 ms is assigned for the restricted state, and in that a data transmission interval of 100 ms is assigned to a fourth congestion control profile for the relaxed state, a data transmission interval of 350 ms is assigned for a first activated state, a data transmission interval of 600 ms is assigned for a second activated state, a data transmission interval of 850 ms is assigned for a third activated state, a data transmission interval of 1100 ms is assigned for a fourth activated state, a data transmission interval of 1350 ms is assigned for a fifth activated state and a data transmission interval of 1600 ms is assigned for the restricted state.

9. The method of claim 1, wherein decentralized environment notification messages are transmitted using a first and/or a second congestion control profile, and/or in that cooperative awareness messages are transmitted using a third congestion control profile.

10. The method of claim 1, wherein the wireless communication system is an ad-hoc network for the communication of mobile devices.

11. The method of claim 1, wherein the wireless communication system is an ITS G5 network or an ad-hoc network for the communication of mobile devices according to a WLAN standard.

12. An apparatus for configuring a data transmission via a transmission channel of a wireless communication system with decentralized congestion control, wherein the decentralized congestion control includes a relaxed state, an activated state and a restricted state, wherein the apparatus is configured to classify into one of five activated states based on a channel load in the transmission channel, and assign a specific data transmission interval to each of four congestion control profiles for each activated state.

13. The apparatus of claim 12, wherein the apparatus is a control device for a transportation vehicle or a mobile radio device.

14. A transportation vehicle, comprising the apparatus of claim 12.

15. A non-transitory computer readable medium storing a computer program product with program code for carrying out a method for configuring a data transmission via a transmission channel of a wireless communication system with decentralized congestion control when the computer program product is executed on a computing unit wherein the decentralized congestion control includes a relaxed state, an activated state and a restricted state, the method comprising classifying into one of five activated states based on a channel load in the transmission channel, and assigning a specific data transmission interval to each of four congestion control profiles for each activated state.

* * * * *